United States Patent [19]

Neff et al.

[11] Patent Number: 5,706,194
[45] Date of Patent: Jan. 6, 1998

[54] NON-UNIQUE SEISMIC LITHOLOGIC INVERSION FOR SUBTERRANEAN MODELING

[75] Inventors: Dennis B. Neff; Scott A. Runnestrand; Edgar L. Butler, all of Bartlesville, Okla.

[73] Assignee: Phillips Petroleum Company, Bartlesville, Okla.

[21] Appl. No.: 457,927

[22] Filed: Jun. 1, 1995

[51] Int. Cl.$^6$ ............................................. G06F 17/10
[52] U.S. Cl. ............................................ 364/421; 364/422
[58] Field of Search .................................. 364/421, 422; 395/929; 367/71, 73, 70

[56] References Cited

U.S. PATENT DOCUMENTS

| | | | |
|---|---|---|---|
| 4,679,174 | 7/1987 | Gelfand | 367/73 |
| 4,797,861 | 1/1989 | Beasley | 367/50 |
| 4,817,062 | 3/1989 | De Buyl et al. | 367/73 |
| 4,967,401 | 10/1990 | Barney | 367/73 |
| 4,982,382 | 1/1991 | Dablain | 367/73 |
| 5,079,749 | 1/1992 | Aminzadeh et al. | 367/73 |
| 5,173,880 | 12/1992 | Duren et al. | 364/421 |

*Primary Examiner*—Donald E. McElheny, Jr.
*Attorney, Agent, or Firm*—George E. Bogatie

[57] ABSTRACT

A method of modeling subsurface reservoir conditions deals with non-uniqueness of seismic reflection signals with respect to reservoir conditions by proposing and then comparing both seismic and lithologic data for forward model sites to select the most likely model for each site. Forward modeling techniques are used to build a synthetic seismic trace catalog, which includes a range of corresponding pseudo-logs for reservoir characteristics that could reasonably exist within a defined region. Then each synthetic seismic trace in the catalog is compared against every real seismic trace, and a number (e.g., 10 to 50) of synthetic traces is selected for association with each real trace that best match the real trace. Finally, the pseudo-logs corresponding to the number of selected synthetic seismic traces for each forward model site are compared to the pseudo-logs selected for adjacent sites to select the most lithologically coherent pseudo-log at each site for use in generating a model display of reservoir characteristics.

22 Claims, 6 Drawing Sheets

(1 of 6 Drawing(s) in Color)

5,706,194

NON-UNIQUE SEISMIC LITHOLOGIC INVERSION FOR SUBTERRANEAN MODELING

This invention relates to combined processing of seismic data and lithologic data, and more particularly to a computer program-implemented method for modeling subterranean formations using synthetic seismograms, and wherein perturbation techniques are applied to subterranean models.

BACKGROUND OF THE INVENTION

For many years seismic exploration for oil and gas has involved the use of a source of seismic energy and its reception by an array of seismic detectors, generally referred to as geophones. When used on land, the source of seismic energy can be a high explosive charge electrically detonated in a borehole located at a selected point on a terrain, or another energy source having capacity for delivering a series of impacts or mechanical vibrations to the earth's surface. The acoustic waves generated in the earth by these sources are transmitted back from strata boundaries and reach the surface of the earth at varying intervals of time, depending on the distance and the characteristics of the subsurface traversed. These returning waves are detected by the geophones, which function to transduce such acoustic waves into representative electrical signals. In use an array of geophones is generally laid out along a line to form a series of observation stations within a desired locality, the source injects acoustic signal into the earth, and the detected signals are recorded for later processing using digital computers where the data are generally quantized as digital sample points such that each sample point may be operated on individually. Accordingly, seismic field records are reduced to vertical and horizontal cross sections which approximate subsurface features. The geophone array is then moved along the line to a new position and the process repeated to provide a seismic survey. More recently seismic surveys involve geophones and sources laid out in generally rectangular grids covering an area of interest so as to expand areal coverage and enable construction of three dimensional views of reflector positions over wide areas.

It is also well known to employ well logs, such as wireline well logs, to accurately determine valuable petrophysical properties associated with a subterranean formation of interest. Petrophysical properties of subterranean formations, which can be obtained from well logging or core sample operations, such as porosity, water or hydrocarbon saturation and lithologic composition, also give valuable information in determining the presence and extent of hydrocarbons in the area of interest. Such well logs and core data, however, are very limited in areal extent e.g. to about six to twelve inches around the borehole in which the measurements were taken. Further the petrophysical properties of a subterranean formation can vary widely at different locations in the formation.

If there is a well within an area to be seismically surveyed, depth well logs of direct measurement of geological information may be made. For example, from the sonic and formation density logs, a synthetic time scale seismic trace may be computed. The synthetic seismic trace is useful for demonstrating to the geophysicists what a seismic time scale trace should be in the presence of the geologic conditions near the well. As used herein a synthetic seismic trace is an artificial seismic signal developed mathematically from a model of subsurface strata and an assumed signal source. Accordingly, multiple synthetic traces can be developed by using petrophysical properties measured at the well as an initial model (or reference point) and making desired perturbations to the measured subterranean properties to obtain model traces which are representative of the lithology near the borehole. This perturbation technique can be expanded to suggest lithologic models farther away from the borehole. Therefore, additional synthetic traces, which are sometimes herein referred to as model traces, may be computed which typify a forward model, i.e. the lithology at some horizontal distance from the borehole.

While synthetic seismic traces may readily be calculated based on actual lithologic data or assumed perturbations to the lithologic data, these traces are subject to certain limitations. For example, a formation made up of a 30 ft thick sand having a porosity of 15% could produce the same synthetic seismic trace as a 10 ft thick sand formation having a porosity of 30%. Accordingly, there exists a non-uniqueness of seismic traces with respect to reservoir structure. In the past seismic lithologic inversion techniques have either: (1) directly transformed a seismic trace into a pseudo-log (usually impedance) via some algorithm such as trace integration, deconvolution or solution of simultaneous equations, or (2) iteratively perturbed models, for forward modeling, on an individual trace basis until synthetic traces generated from them adequately matched the actual seismic data. Since both of these methods fail to address the non-uniqueness limitation of synthetic seismic traces with respect to reservoir acoustic properties, confidence in the reservoir models based on these synthetic traces is lacking.

In the inverse case, from a recorded time-scale seismic trace or a synthetic seismic trace, and assuming certain initial conditions, one can derive a depth scale well log showing lithologic data. Such a derived well log may be termed a pseudo-log. As used herein a pseudo-log is an artificial log of shale volume, porosity, pay flag, water saturation, sonic or density which may be derived by inverting a seismic trace based on assumed petrophysical properties or by perturbing petrophysical properties of an initial well log. While pseudo-logs may be readily calculated based on a seismic trace, these pseudo-logs are also subject to non-uniqueness in the transformation of petrophysical parameters to acoustic impedance.

In activities such as reservoir mapping, engineering production simulation, and horizontal drilling, detailed subterranean information about the thickness, geometry, porosity, shaliness, hydrocarbon saturation, and permeability of reservoir rock formations is required. This data is needed in areal spacings of thirty to three-hundred feet, however, borehole penetrations are usually thousands of feet apart in reservoirs. Three-dimensional seismic surveys take subsurface readings at areal spacings of tens of feet and so can help guide the creation of the aforementioned petrophysical maps if the seismic trace records can be matched to pseudo well logs.

Therefore a need remains to accurately convert the combination of lithologic data and seismic data into detailed displays of reservoir characteristics such as porosity etc.

Accordingly, it is an object of this invention to utilize seismic data in providing displays of various subterranean reservoir characteristics over relatively wide regions.

Another object is to merge the independent knowledge of the geologist, geophysicists and the petrophysicists into a method for predicting reservoir characteristics.

Another more specific object of this invention is to create a catalog of synthetic time scale seismic recordings that bracket the lithology of the studied region.

A further object is to match pseudo well logs and seismic data.

Still another more specific object of this invention is to provide a lithologic model of a portion of the subterranean earth showing sufficient resolution of characteristics to guide drilling of extended horizontal wellbores.

A still further object of this invention is to produce a computer program which generates a high resolution image of subsurface formations.

SUMMARY OF THE INVENTION

According to this invention, the foregoing and other objects are attained by a method of modeling petrophysical properties of subterranean formations which yields a high resolution image representative of characteristics of subterranean structure. A first step is obtaining data including a seismic survey along with lithologic information, for example, from a well log. The method defines an initial lithologic model which agrees with measured sonic, density and layer thickness well logs. Seismic trace data corresponding to the well location is associated with the initial model such that the lithologic data is paired with seismic data. Forward model perturbation techniques are then used for constructing pseudo-logs at a desired number of forward model sites away from the well. Based on these pseudo-logs, a corresponding number of synthetic seismic traces are determined so that each forward model is associated with a synthetic seismic model trace that matches the lithologic parameter of the pseudo-log. In this manner a catalog of synthetic seismic model traces and corresponding pseudo-logs is generated and stored in computer memory for further processing. Then, using the computer for comparing every synthetic model trace in the catalog to each real trace of the seismic survey, several (e.g., 10 to 50) different synthetic seismic model traces are selected for each real seismic trace that "best fit" the real seismic trace in some manner. Next, the petrophysical properties modeled in the several pseudo-logs corresponding to the several "best fit" synthetic seismic traces corresponding to a specific forward model site are numerically compared to the corresponding petrophysical properties modeled by the pseudo-logs at adjacent forward model sites. Finally, a single pseudo-log is chosen for each forward model site based on the numerical values determined in the coherence analysis scheme for comparing petrophysical properties at adjacent forward model sites, and the chosen property for each model site is assigned to a display model which is a visual representation of lithologic characteristics of subsurface formations.

In accordance with another aspect of this invention, apparatus comprises a computer programmed to carry out the above described method. In accordance with yet another aspect of this invention, a program storage device comprises a computer readable medium having computer program code means embodied therein for causing the computer to carry out the above described method.

BRIEF DESCRIPTION OF THE DRAWINGS

The file of the patent contains at least one drawing executed in color. Copies of this patent with the color drawing will be provided by the Patent and Trademark Office upon request and payment of the necessary fee.

DETAILED DESCRIPTION OF THE PREFERRED EMBODIMENT

The abundance of three-dimensional seismic data that is available, and the increased attention by geophysists to reservoir characterization studies, have provided combinations of basic data from which improved seismic inversion schemes can be applied. The basic data to which this invention is applied is in the form of a spacial sequence of seismic time scale traces, which have been recorded, stacked and properly migrated over a restricted time window as known in the art, and geological and petrophysical information from one or more wells. Synthetic seismograms and pseudo-logs can be computed from the basic data. Details of wavelet processing for producing synthetic seismograms, is disclosed with reference to FIG. 3. in patent application Ser. No. 08/069,247, of Dennis Neff, filed May 28, 1993, now allowed, the disclosure of which is incorporated herein by reference. Also explained with reference to FIG. 4 of the incorporated disclosure are details of producing pseudo-logs including lithologic ($V_{SH}$), saturation ($S_W$), porosity ($\phi$), pay zone, sonic ($\Delta t$) and density ($\rho$) logs.

Figure 3:
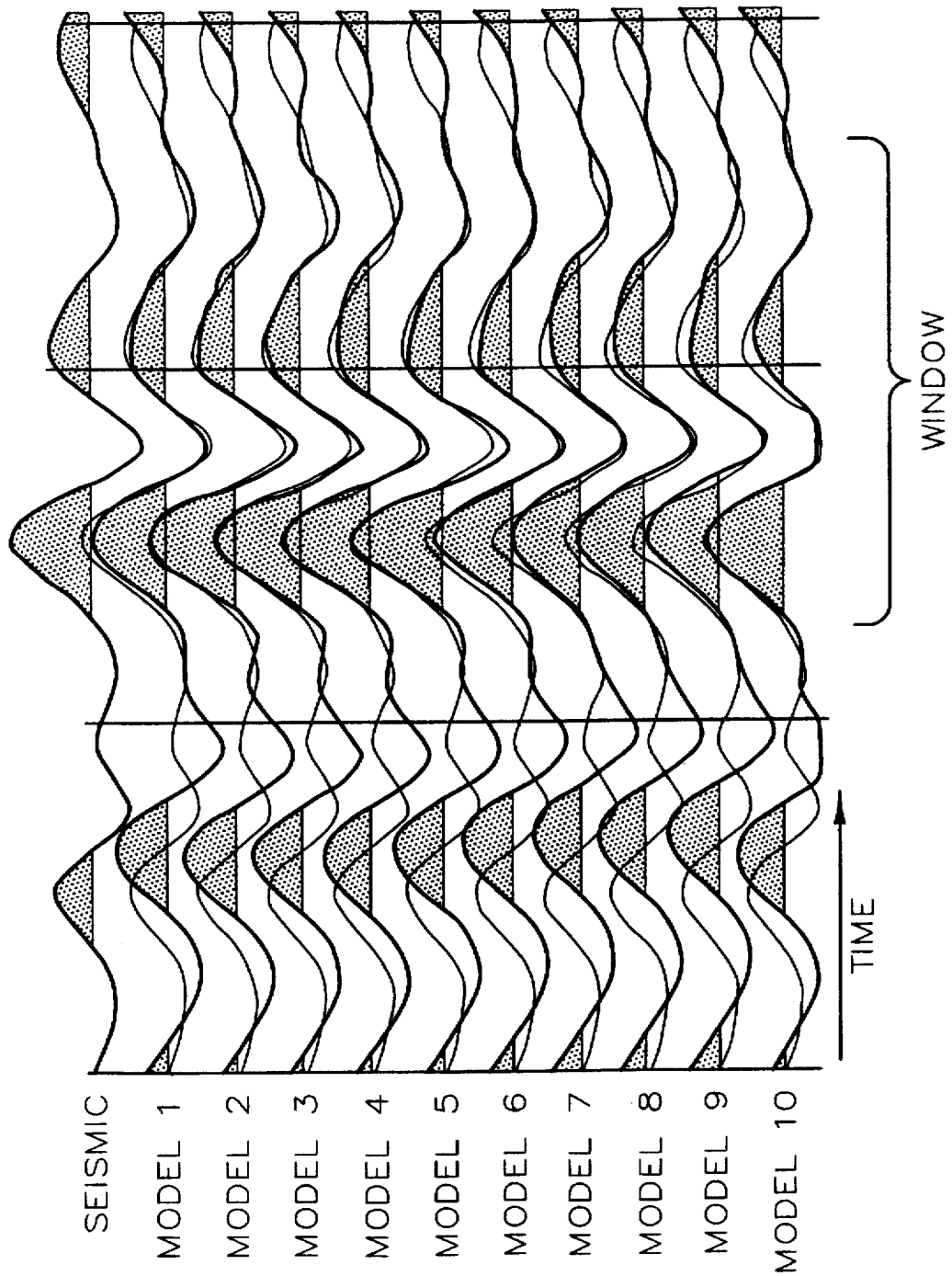
FIG. 3 is a comparison of seismic and model traces.

In the preferred embodiment of this invention, the lithologic parameters of the respective known formation at well locations are systematically perturbed and corresponding synthetic seismograms are determined in order to build a catalog of synthetic model traces of sufficient size that includes a range of lithologic and petrophysical parameters that bracket known conditions around the well. The process of matching the synthetic seismic model traces to real traces includes a calculation of three factors which establish a measure of the similarity between synthetic and real traces. These factors include an absolute average difference factor, RB factor and a crosscorrelation coefficient, where any of these factors may be weighted depending, for example, on confidence in the basic data. The crosscorrelation technique is usually limited to a small time window of about thirty milliseconds (ms) to one-hundred ms of the seismic trace, as illustrated in FIG. 3. This time window is adjusted to include the reservoir zone of interest plus any overburden or underburden zones that could influence seismic reflections. Because many of the solutions that satisfy the seismic data alone can be ruled out as being geologically unacceptable, a coherent analyses scheme is then used to compare the pseudo-logs which are paired with the selected "best fit" seismic model traces selected for a given location (i.e., FIG. 4, at 0,0) to the pseudo-logs which are paired with "best fit" seismic model traces of neighboring locations. A numerical coherence analysis then selects the single pseudo-log that best describes the lithologic parameters for the specified location and that pseudo-log is accepted for use in the image display model illustrated in FIG. 6.

Figure 1A:
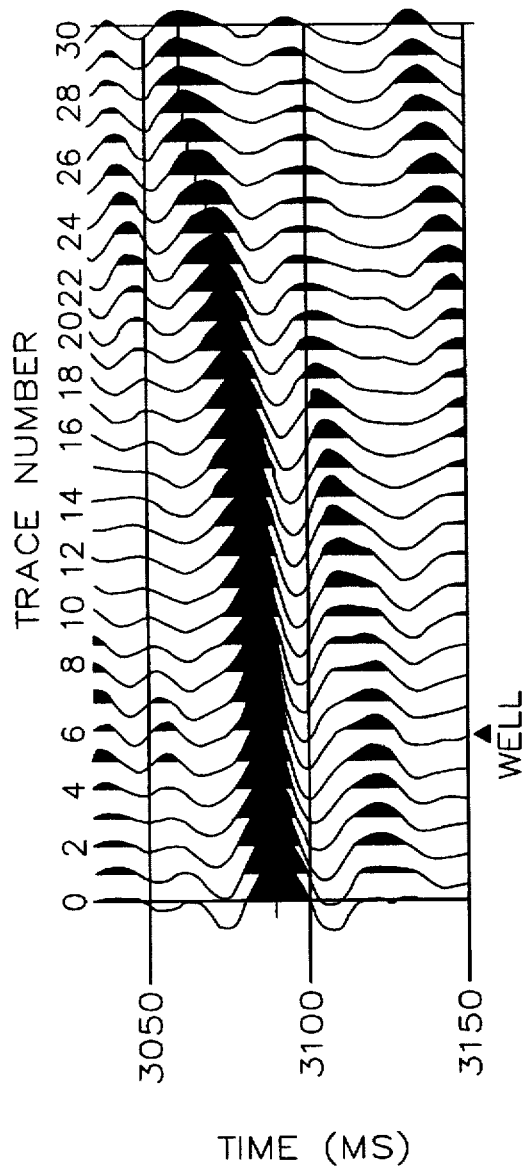
FIG. 1A represents a typical seismic section.
Figure 1B:
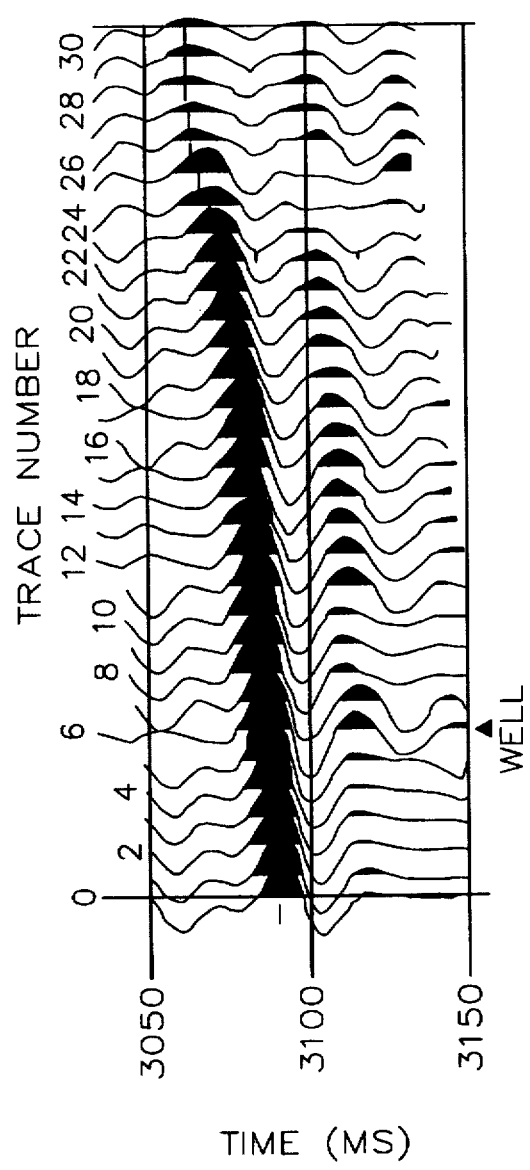
FIG. 1B represents model traces corresponding to the section of FIG. 1A.
Figure 2:
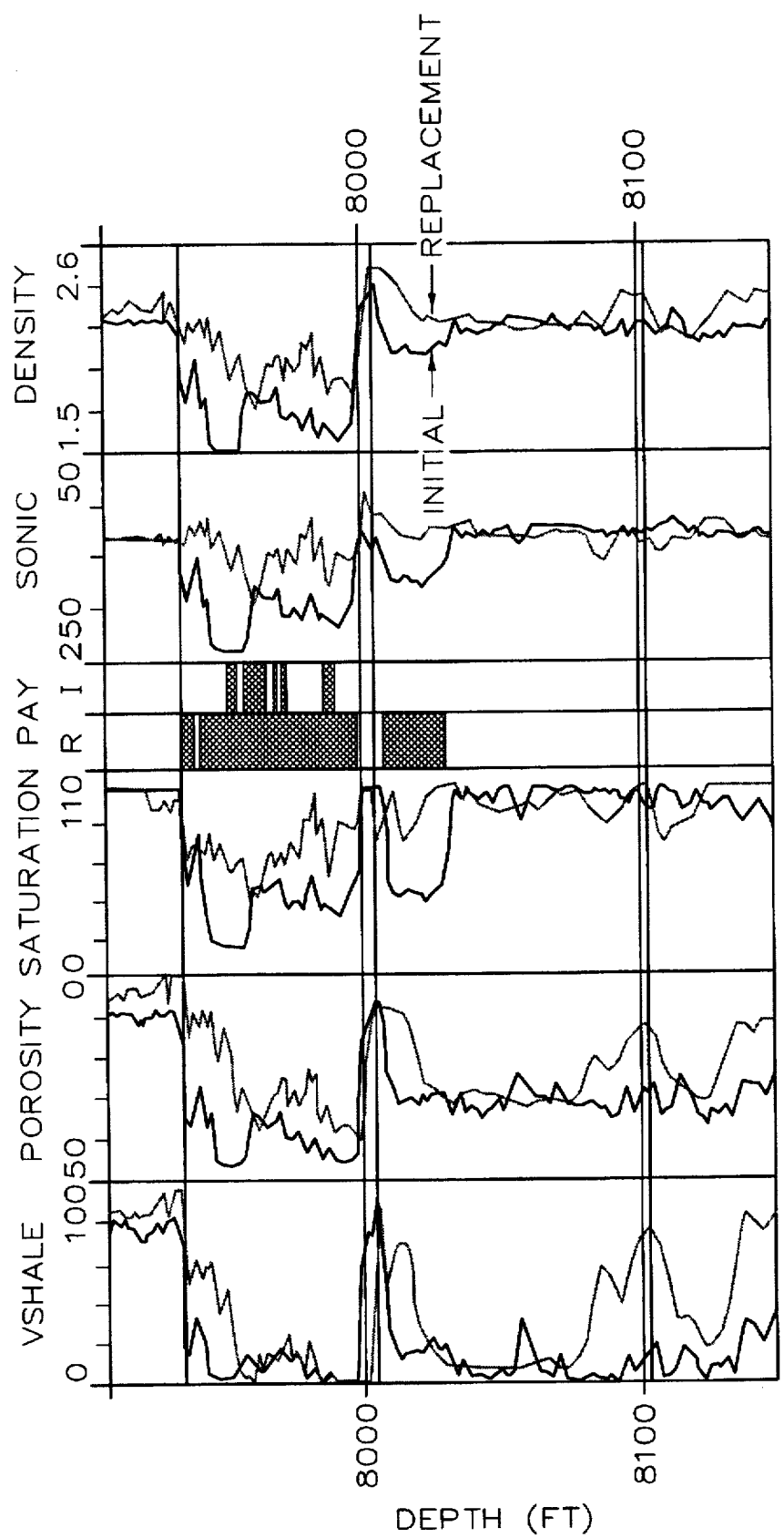
FIG. 2 illustrates a lithological log suite pertinent to this invention.

Referring now to FIG. 1A, there is illustrated a seismic section of recorded and processed seismic traces, and FIG. 1B shows corresponding model traces, which would typically be synthetic traces. Seismic station numbers 0–30 are indicated at the top of the sections on the horizontal axis. Intervals of two-way seismic wave travel time in milliseconds are marked on the vertical axis. FIG. 2 shows a typical computer workstation display for the suit of logs including lithologic parameters of shaliness ($V_{SH}$), saturation ($S_W$), porosity ($\phi$), pay zone, sonic ($\Delta t$) and density ($\rho$). Appropriate scales for the illustrated logs are marked on the horizontal axis, and the well depth in feet is indicated on the vertical axis. Also shown in FIG. 2 by the dark horizontal lines are the definition of layer boundaries for reflecting horizons indicating the cross section of a volume which could be selected for detailed modeling according to this invention.

Parameters of interest for modeling include those which indicate a subterranean layer containing hydrocarbons in sufficient quantity to justify commercial production such as layer thickness, porosity, water saturation, etc. In the method of this invention seismic traces corresponding to a well location, such as trace 6 in FIG. 1A, are associated with petrophysical parameters which are known, for example, from well logs. A statistical or deterministic wavelet is derived, and then tested by computing a set of synthetic time scale traces which are compared to the original seismic trace by crosscorrelation and further by an average absolute value difference between synthetic and real seismic traces at the maximum crosscorrelation position. The wavelet is typically adjusted until a crosscorrelation value of 0.98 or better is achieved for synthetic seismograms at well locations.

Forward modeling is then employed where perturbations in petrophysical properties are representative of probable and reasonable variations of the property or properties of the initial model, without regard to analysis of seismic traces at the forward model site. Paring of a pseudo-log and a model seismic trace will necessitate alignment of the two traces, which will generally involve shifting the time axis of either with respect to the other to determine the alignment that gives the best match. Typical initial and replacement values for the various logs are illustrated in FIG. 2, where solid lines indicate the initial value and light gray lines indicate replacement values. The depth scale for the logs, such as illustrated of FIG. 2, are converted to the time scale of a corresponding seismic section for comparison, since the more prominent reflections on a seismic section will approximately correspond to gross excursions of the sonic log trace.

Referring now to FIG. 3, there is illustrated a comparison of seismic and model traces, where ten "best fit" model traces corresponding to a specific seismic trace are selected. The selection method shown utilized two reference horizons. However, a single horizon which serves as the zero lag position for crosscorrelation operations and as a reference time for the positioning of pseudo time logs may be employed. The length of the crosscorrelation window includes the time thickness of the reservoir layer plus the time for ½ wavelength above and below the reservoir. The seismic data volume is relative amplitude and preferably zero phase. Frequency content and signal-to-noise ratio are maximized through standard wavelet processing schemes. If desired, relative weighting factors can be applied to the crosscorrelation, absolute difference and/or RB factor terms included in the following table.

TABLE I

Seismic Trace Comparison

| Model CDP | X-Corr Coefficient | X-Corr Lag | Avg abs Diff | RB-Factor |
|---|---|---|---|---|
| 1 | 0.9858 | 2 | 0.0100 | 0.9841 |
| 2 | 0.9903 | 2 | 0.0091 | 0.9885 |
| 3 | 0.9864 | 2 | 0.0104 | 0.9834 |
| 4 | 0.9855 | 2 | 0.0104 | 0.9830 |
| 5 | 0.9843 | 3 | 0.0090 | 0.9858 |
| 6 | 0.9867 | 3 | 0.0089 | 0.9871 |
| 7 | 0.9841 | 2 | 0.0093 | 0.9850 |
| 8 | 0.9851 | 2 | 0.0088 | 0.9865 |
| 9 | 0.9852 | 2 | 0.0098 | 0.9842 |
| 10 | 0.9862 | 1 | 0.0080 | 0.9890 |

Table I shows the numerical comparison of the traces illustrated in FIG. 3 where all of the crosscorrelation coefficients are greater than 0.984; correlation lags are 3 or less; average absolute difference is 0.0104 or less; and the RB factor is greater than 0.983. A crosscorrelation value of 1.0 with an average difference value of 0.0 represents a perfect match. The most robust comparison of model and seismic traces occurs, however, when the crosscorrelation and absolute value differences are independently normalized to a scale of −1.0 to 1.0 and then ranked upon a combined value which is called the RB factor, which is show in Table I. An RB factor of 1.0 represents a perfect match and values less than 1.0 reflect progressively less similar waveforms.

Figure 4:
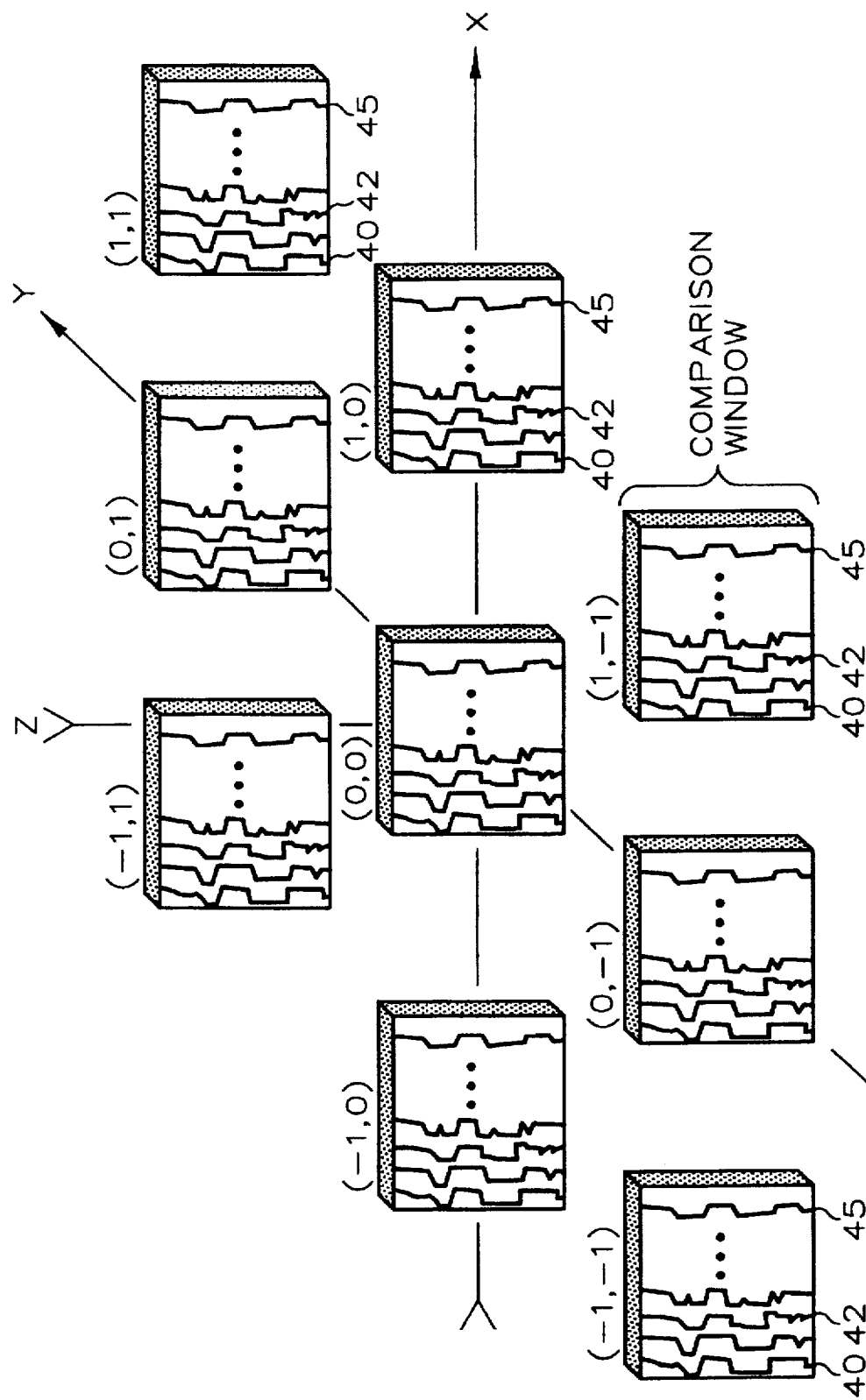
FIG. 4 illustrates the coherence analysis scheme according to the invention.

Referring now to FIG. 4, there is illustrated nine forward model station sites within an area to be modeled, where the sites are identified according to x, y coordinates shown by the numbers in parenthesis. A third axis labeled z is also shown which is indicative of time or alternately depth. For each forward model site there is shown the several pseudo-log traces, illustrated at reference numerals 40–45, which were previously paired with the real seismic survey trace which is characteristic of that site.

Comparison of the pseudo-logs corresponding to the "best fit" synthetic seismic model traces for a given location, such as (0, 0) in FIG. 4, to the corresponding pseudo-logs of adjacent sites is accomplished using a numerical average difference analysis. At the central location, the pseudo-log with the lowest composite difference value is selected for use in the image display model illustrated in FIG. 6, and the relative ranking of the other "best fit" model traces is adjusted accordingly. FIG. 4 illustrates use of pseudo-logs from eight adjacent locations which are considered for choosing the single pseudo-log for use in the image display model for the central location. The areal coherence scheme includes criteria such as: (a) which pseudo-log (i.e. porosity, impedance, etc.) to compare; (b) the number of pseudo-logs at each location; (c) the depth or time interval(s) used for comparison; (d) quality of the seismic match; and (e) radial distance from the central location. Relative weighting factors may also be used in conjunction with the above criteria. For example, diagonal corner traces, such as (1, 1) and (−1, −1) in FIG. 4 are preferably weighted at 70%. In general, the same time window is used for coherence testing of pseudo-logs, and crosscorrelation of seismic traces. This time window is illustrated in FIG. 3 for crosscorrelation of seismic waveform, and is illustrated in FIG. 4 for coherence of lithologic logs.

Figure 6:
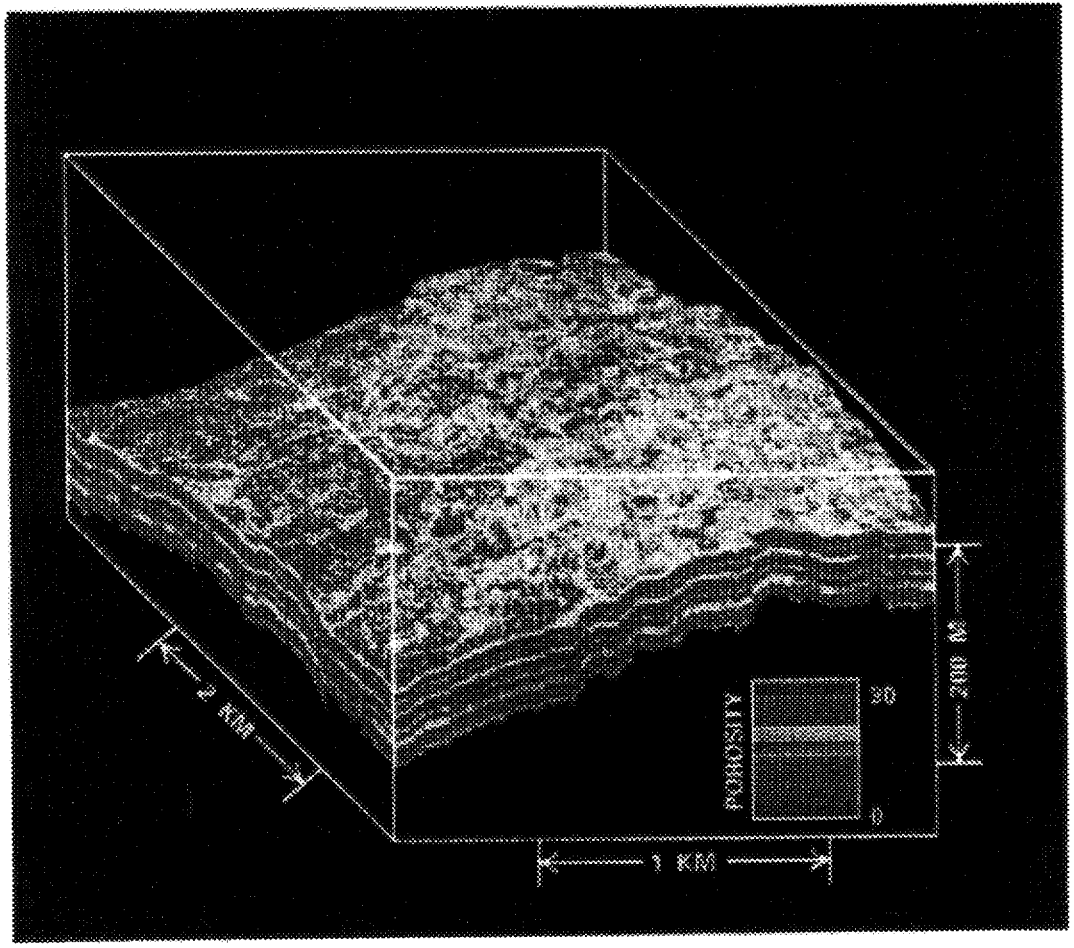
FIG. 6 is a color display, which is a product of the invention.

The coherence matching scheme results in maps and three dimensional image model displays of subterranean volumes having more geologically reasonable trends, while still maintaining high resolution and detail. FIG. 6 illustrates a three dimensional color display of a subterranean volume showing porosity values according to a color code where red indicates high porosity, yellow indicates intermediate and blue indicates low porosity. This image display is a product of this invention.

Since the number of synthetic model traces contained in a typical catalog may range from 1,000 to about 30,000, the above described iterative and selecting processes require a considerable amount of detailed computation. Because of the great number of calculations needed, these processes are preferably computer implemented in accordance with the simplified flow diagram of FIG. 5.

Figure 5:
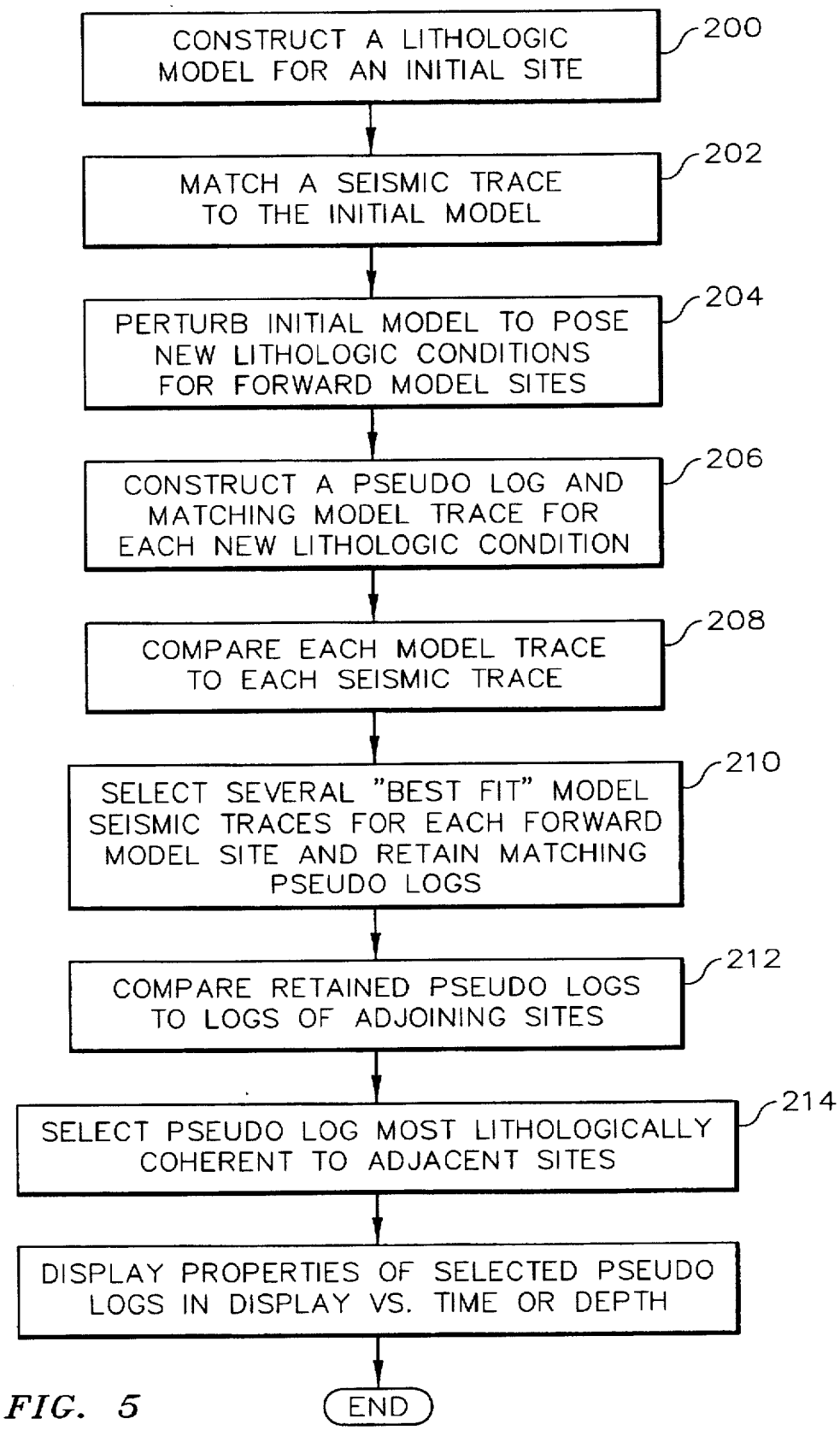
FIG. 5 is a simplified computer flow chart according to the invention.

In FIG. 5, initially all seismic data, which typically includes a three-dimensional seismic survey, and all available lithologic data which generally includes one or more well logs, are quantized as digital samples and assembled for input into a computer suitable for processing the volume of data, such as a Sparc-10 computer. In block 200 a log suit, as illustrated in FIG. 2, which, for example, includes lithologic parameters such as shaleness ($V_{SH}$); porosity ($\phi$); saturation ($S_W$); pay zone; sonic ($\Delta t$); and density ($\rho$), is defined based on the input well log data. A model, which includes a reflectivity series determined from velocity (sonic) and density logs, as known in the art, is calculated for the initial location. In block 202, standard wavelet processing techniques are used in conjunction with the initial model to produce synthetic traces which are compared to real seismic traces at the initial site until a synthetic seismic model trace is found which matches the real seismic trace within a predetermined threshold, such as a crosscorrelation value of 0.98. In block 204, perturbation techniques are applied to the initial model. For example logs selected from the suit shown in FIG. 2, may be perturbed in amplitude or layer thickness. Also these logs may be perturbed concurrently, individually or a combination of two or more properties could be modified. These modification steps are more fully described in step number five of the incorporated reference.

For each new lithologic condition proposed in block 204, a pseudo-log and corresponding synthetic seismic model trace are constructed using known techniques for calculating a reflectivity series for the new lithologic conditions, and known wavelet processing techniques. The pseudo-logs and corresponding seismic model traces are aligned in time for maximum correlation. Next, in block 208 each model trace is independently compared to each real seismic trace by crosscorrelation, etc., and several "best fit" seismic model traces are selected in block 210 for each real seismic trace based on data such as shown in Table I. The pseudo-logs paired with the "best fit" seismic traces are retained for comparison in block 212, where the pseudo-logs corresponding to the "best fit" synthetic seismic traces for each site are compared with corresponding pseudo-logs of adjoining sites. In block 214, the most likely pseudo-logs to describe the combination of lithologic and seismic data for each forward model site are selected based on numerical difference calculation yielding the lowest composite difference between corresponding pseudo-logs of adjoining sites.

There has accordingly been described a system and method for detailed modeling of subterranean volumes, and a computer programmed to carry out the method. In this disclosure, there has been described only the preferred embodiment of the invention, but, it is to be understood that the invention can serve various other environments which can include changes or modifications within the scope of the inventive concept as expressed herein.

That which is claimed:

1. A computer implemented method for converting real seismic traces from a seismic survey composed of reflection signals which typify subterranean discontinuities, and lithologic well log data representative of the structure and texture of subterranean layers, into a model image of subterranean characteristics and structure to be displayed on a display means, said method comprising:

(a) determining an initial model based on said lithologic well log data and said real seismic traces, which are representative of known petrophysical parameters at an initial site;

(b) perturbing said initial model to propose a plurality of new petrophysical parameters that bracket said known petrophysical parameters at said initial site for a plurality of forward model sites, wherein said forward model sites are spaced apart in an area included in said seismic survey, and wherein each forward model site is associated with a single one of said real seismic traces, which is thus designated as a characteristic seismic trace for the corresponding forward model site;

(c) building a catalog of synthetic seismic model traces and corresponding pseudo-logs, and storing said catalog in a memory of said computer, said catalog containing a synthetic seismic model trace and a corresponding pseudo-log for each one of said plurality of new petrophysical parameters;

(d) selecting a set of said synthetic seismic model traces having a corresponding set of said pseudo-logs from said catalog for association with each one of said characteristic seismic traces;

(e) designating a selected one pseudo-log from said set of pseudo-logs associated with each of said characteristic traces, as a prime pseudo-log for association with each one of said characteristic seismic traces selected in step (d) to provide a plurality of prime pseudo-logs, whereby each one of said plurality of prime pseudo-logs is associated with a corresponding one of said forward model sites; and (f) using said plurality of prime pseudo-logs selected in step (e) for generating said model image of subterranean characteristics.

2. A method in accordance with claim 1, wherein said step (d) of selecting said set of synthetic seismic model traces for association with each site of said characteristic seismic traces comprises:

(a) comparing each synthetic model trace in said catalog to a first characteristic seismic trace corresponding to a first forward model site;

(b) selecting said set of synthetic model traces for said first forward model site as the set that best match said first characteristic seismic trace corresponding to said first forward model site; and (c) repeating steps (a) and (b) for each remaining characteristic seismic trace.

3. A method in accordance with claim 2, wherein said step of comparing each synthetic seismic model trace in said catalog includes:

establishing a numerical measure of the similarity between said synthetic seismic model traces and said real seismic traces, wherein said numerical measure includes values for the following factors:
i. a crosscorrelation coefficient;
ii. a crosscorrelation lag;

iii. an absolute average difference; and iv. an RB factor.

4. A method in accordance with claim 1, wherein said step (e) for designating said one pseudo-log as said prime pseudo-log for each site of said plurality of forward model sites comprises:

(a) comparing each pseudo-log in said set of pseudo-logs corresponding to said set of synthetic seismic model traces selected for association with said characteristic trace for a first forward model site, to a plurality of like pseudo-logs selected for association with at least a second forward model site, wherein said second forward model site is adjacent said first said forward model site;

(b) using the comparisons made in step (a) for determining a numerical measure for the similarity between each pseudo-log associated with said first forward model site and said plurality of like pseudo-logs associated with at least said second forward model site;

(c) selecting said prime pseudo-log for describing said first forward model site as the pseudo-log having the highest similarity to said plurality of like pseudo-logs of at least said second forward model site; and (d) repeating steps (a), (b) and (c) for each remaining forward model site of said plurality of forward model sites.

5. A method in accordance with claim 4, wherein each pseudo-log in said set of pseudo-logs associated with said first forward model site is compared to a plurality of like pseudo-logs for a plurality of adjacent forward model sites, and wherein said numerical measure comprises a numerical difference calculation, said method includes:

selecting said prime pseudo-log from said set of pseudo-logs for as the pseudo-log having the lowest composite numerical difference compared to said plurality of like pseudo-logs of said plurality of adjacent forward model sites for use in generating said model image display.

6. A method in accordance with claim 1, wherein said petrophysical parameters are selected from the group of parameters consisting of: layer thickness, shaliness, water or hydrocarbon saturation, porosity, pay zone, sonic and density, any derivative of one or more of the aforementioned parameters, and combinations thereof.

7. A method in accordance with claim 1, wherein said lithologic well log data is expressible as a curve representing the data as a function of time or depth.

8. A method in accordance with claim 1, wherein said catalog of synthetic seismic model traces contains from about 1,000 traces to about 30,000 traces.

9. A method in accordance with claim 1, wherein said set of synthetic seismic model traces for each of said characteristic traces includes from about 10 synthetic seismic model traces to about 50 such traces.

10. A method in accordance with claim 3, wherein said crosscorrelation coefficient is determined over a time window of about 30 milliseconds to about 100 milliseconds.

11. A method in accordance with claim 1 additionally comprising:

(a) using a seismic source to inject acoustic signals into the earth;

(b) detecting reflections from said acoustic signals transmitted back to the surface of the earth by subterranean discontinuities;

(c) recording said reflection signals; and (d) processing said reflection signals to produce said real seismic traces in said seismic survey.

12. Apparatus for convening real seismic traces from a seismic survey composed of reflection signals which typify subterranean discontinuities, and lithologic well log data representative of the structure and texture of subterranean layers, into a model image of subterranean characteristics and structure to be displayed on a display means, said apparatus comprising:

a computer programmed to perform method steps comprising:

(a) determining an initial model based on said lithologic well log data and said real seismic traces, which are representative of known petrophysical parameters at an initial site;

(b) perturbing said initial model to propose a plurality of new petrophysical parameters that bracket said known petrophysical parameters at said initial site for a plurality of forward model sites, wherein said model sites are spaced apart in an area included in said seismic survey, and wherein each forward model site is associated with a single one of said real seismic trace, which is thus designated as a characteristic seismic trace for the corresponding forward model site;

(c) building a catalog of synthetic seismic model traces and corresponding pseudo-logs, and storing said catalog in a memory of said computer, said catalog containing a synthetic seismic model trace and a corresponding pseudo-log for each one of said plurality of new petrophysical parameters;

(d) selecting a set of said synthetic seismic model traces having a corresponding set of said pseudo-logs from said catalog for association with each one of said characteristic seismic traces;

(e) designating a selected one pseudo-log from said set of pseudo-logs associated with each of said characteristic traces, as a prime pseudo-log for association with each one of said characteristic seismic traces selected in step (d) to provide a plurality of prime pseudo-logs, whereby each one of said plurality of prime pseudo-logs is associated with a corresponding one of said forward model sites; and (f) using said plurality of prime pseudo-logs selected in step (e) for generating said model image of subterranean characteristics.

13. Apparatus in accordance with claim 12, wherein said computer programmed method step (d) of selecting said set of synthetic model traces for association with each of said characteristic seismic traces comprises:

(a) comparing each synthetic model trace in said catalog to a first characteristic seismic trace corresponding to a first forward model site;

(b) selecting said set of synthetic model traces for said first forward model site as the set that best match said first characteristic seismic trace corresponding to said first forward model site; and (c) repeating steps (a) and (b) for each remaining characteristic seismic trace.

14. Apparatus in accordance with claim 13, wherein said step (a) of comparing each synthetic seismic model trace in said catalog includes:

establishing a numerical measure of the similarity between said synthetic seismic model traces and said real seismic traces, wherein said numerical measure includes values for the following factors:

i. a crosscorrelation coefficient;

ii. a crosscorrelation lag;

iii. an absolute average difference; and iv. an RB factor.

15. Apparatus in accordance with claim 12, wherein said computer programmed method step (e) for designating said one pseudo-log as said prime pseudo-log for each site of said plurality of forward model sites comprises:

(a) comparing each pseudo-log in said set of pseudo-logs corresponding to said set of synthetic seismic model traces selected for association with said characteristic trace for a first forward model site, to a plurality of like pseudo-logs selected for association with at least a second forward model site, wherein said second forward model site is adjacent said first said forward model site;

(b) using the comparisons made in step (a) for determining a numerical measure for the similarity between each pseudo-log associated with said first forward model site and said plurality of like pseudo-logs associated with at least said second forward model site;

(c) selecting said prime pseudo-log for describing said first forward model site as the pseudo-log having the highest similarity to said plurality of like pseudo-logs of at least said second forward model site; and (d) repeating steps (a), (b) and (c) for each remaining forward model site of said plurality of forward model sites.

16. Apparatus in accordance with claim 15, wherein each pseudo-log in said set of pseudo-logs associated with said first forward model site is compared to a plurality of like pseudo-logs for a plurality of adjacent forward model sites, and wherein said numerical measure comprises a numerical difference calculation, said computer programmed method includes:

selecting said prime pseudo-log from said set of pseudo-logs for use in generating said model image, as the pseudo-log having the lowest composite difference compared to said plurality of like pseudo-logs of said plurality of adjacent forward sites.

17. Apparatus in accordance with claim 12, additionally comprising:

(a) a seismic source for injecting acoustic signals into the earth;

(b) means for detecting acoustic reflection signals transmitted back to the surface of the earth by subterranean discontinuities;

(c) means for recording said reflection signals; and (d) means for processing said reflection signals to produce said real seismic traces in said seismic survey.

18. A program storage device, readable by a computer, tangibly embodying a program of instructions executable by said computer to perform method steps for converting real seismic traces from a seismic survey composed of reflection signals which typify subterranean discontinuities, and lithologic well log data representative of the structure and texture of subterranean layers, into a model image of subterranean characteristics and structure to be displayed on a display means, said method steps comprising:

(a) determining an initial model based on said lithologic well log data and said real seismic traces, which are representative of known petrophysical parameters at an initial site;

(b) perturbing said initial model to propose a plurality of new petrophysical parameters that bracket said known petrophysical parameters at said initial site for a plurality of forward model sites, wherein said forward model sites are spaced apart in an area included in said seismic survey, and wherein each forward model site is associated with a single one of said real seismic traces, which is thus designated as a characteristic seismic trace for the corresponding forward model site;

(c) building a catalog of synthetic seismic model traces and corresponding pseudo-logs, and storing said catalog in a memory of said computer, said catalog containing a synthetic seismic model trace and a corresponding pseudo-log for each one of said plurality of new petrophysical parameters;

(d) selecting a set of said synthetic seismic model traces having a corresponding set of said pseudo-logs from said catalog for association with each one of said characteristic seismic traces;

(e) designating a selected one pseudo-log from said set of pseudo-logs associated with each of said characteristic traces, as a prime pseudo-log for association with each one of said characteristic seismic traces selected in step (d) to provide a plurality of prime pseudo-logs, whereby each one of said plurality of prime pseudo-logs is associated with a corresponding one of said forward model sites; and (f) using said plurality of prime pseudo-logs selected in step (e) for generating said model image of subterranean characteristics.

19. A program storage device in accordance with claim 18, wherein said method step (d) of selecting said set of synthetic model traces for association with each one of said characteristic seismic traces comprises:

(a) comparing each synthetic model trace in said catalog to a first characteristic seismic trace corresponding to a first forward model site;

(b) selecting said set of synthetic model traces for said first forward model site as the set that best match said first characteristic seismic trace corresponding to said first forward model site; and (c) repeating steps (a) and (b) for each remaining characteristic seismic trace.

20. A program storage device in accordance with claim 19, wherein said step (a) of comparing each synthetic seismic model trace in said catalog includes:

establishing a numerical measure of the similarity between said synthetic seismic model traces and said real seismic traces, wherein said numerical measure includes values for the following factors:
i. a crosscorrelation coefficient;
ii. a crosscorrelation lag;
iii. an absolute average difference; and
iv. an RB factor.

21. A program storage device in accordance with claim 18, wherein said method step (e) for designating said one pseudo-log as said prime pseudo-log for each site of said plurality of forward model sites comprises:

(a) comparing each pseudo-log in said set of pseudo-logs corresponding to said set of synthetic seismic model traces selected for association with said characteristic trace for a first forward model site, to a plurality of like pseudo-logs selected for association with at least a second forward model site, wherein said second forward model site is adjacent said first said forward model site;

(b) using the comparisons made in step (a) for determining a numerical measure for the similarity between each pseudo-log associated with said first forward model site and said plurality of like pseudo-logs associated with at least said second forward model site;

(c) selecting said prime pseudo-log for describing said first forward model site as the pseudo-log having the highest similarity to said plurality of like pseudo-logs of at least said second forward model site; and (d) repeating steps (a), (b) and (c) for each remaining forward model site of said plurality of forward model sites.

22. A program storage device in accordance with claim 21, wherein each pseudo-log in said set of pseudo-logs associated with said first forward model site is compared to a plurality of like pseudo-logs for a plurality of adjacent forward model sites, and wherein said numerical measure comprises a numerical difference calculation, said method steps embodied on said storage device includes:

selecting said prime pseudo-log from said set of pseudo-logs for use in generating said model image, as the pseudo-log having the lowest composite difference compared to said plurality of like pseudo-logs of said plurality of adjacent forward model sites.

* * * * *